United States Patent
Schelten et al.

(10) Patent No.: US 9,430,817 B2
(45) Date of Patent: Aug. 30, 2016

(54) BLIND IMAGE DEBLURRING WITH CASCADE ARCHITECTURE

(71) Applicant: Microsoft Corporation, Redmond, WA (US)

(72) Inventors: Kevin Schelten, Darmstadt (DE); Reinhard Sebastian Bernhard Nowozin, Cambridge (GB); Jeremy Jancsary, Cambridge (GB); Carsten Curt Eckard Rother, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/077,247

(22) Filed: Nov. 12, 2013

(65) Prior Publication Data

US 2015/0131898 A1    May 14, 2015

(51) Int. Cl.
G06K 9/62    (2006.01)
G06T 5/00    (2006.01)
G06K 9/40    (2006.01)

(52) U.S. Cl.
CPC ............... *G06T 5/003* (2013.01); *G06K 9/40* (2013.01); *G06K 9/6262* (2013.01); *G06K 9/62* (2013.01); *G06T 2207/20081* (2013.01); *G06T 2207/20201* (2013.01)

(58) Field of Classification Search
CPC .................... G06T 5/003; G06T 2207/20201; G06T 2207/20192; G06T 2207/20081; G06T 7/0042; G06T 5/005; G06T 5/002; G06T 5/00; G06T 5/001; H04N 5/23229; H04N 5/235; H04N 1/32144; H04N 1/32203; H04N 2201/3225; H04N 2201/3269; H04N 5/23219; H04N 5/23248; H04N 21/47; G06K 9/40; G06K 9/626; G06F 17/30699; G06F 17/30867; G06F 17/30038

USPC ....... 382/131, 159, 254, 255, 266, 274, 275, 382/103, 226, 284, 299, 300; 348/208, 241, 348/222
See application file for complete search history.

(56) References Cited

U.S. PATENT DOCUMENTS

| | | | | |
|---|---|---|---|---|
| 5,453,844 A | * | 9/1995 | George | .............. H04N 19/60 375/E7.226 |
| 5,466,904 A | * | 11/1995 | Pfeiffer | .............. B82Y 10/00 219/121.25 |

(Continued)

FOREIGN PATENT DOCUMENTS

WO    2012041492 A1    4/2012

OTHER PUBLICATIONS

Pan, et al.,"Kernel Estimation from Salient Structure for Robust Motion Deblurring", In Proceedings of in the Computing Research Repository, Dec. 2012, pp. 29.

(Continued)

*Primary Examiner* — Vu Le
*Assistant Examiner* — Aklilu Woldemariam
(74) *Attorney, Agent, or Firm* — Tom Wong; Micky Minhas; Zete Law, P.L.L.C.

(57) ABSTRACT

Blind image deblurring with a cascade architecture is described, for example, where photographs taken on a camera phone are deblurred in a process which revises blur estimates and estimates a blur function as a combined process. In various examples the estimates of the blur function are computed using first trained machine learning predictors arranged in a cascade architecture. In various examples a revised blur estimate is calculated at each level of the cascade using a latest deblurred version of a blurred image. In some examples the revised blur estimates are calculated using second trained machine learning predictors interleaved with the first trained machine learning predictors.

20 Claims, 7 Drawing Sheets

(56) References Cited

U.S. PATENT DOCUMENTS

| | | | |
|---|---|---|---|
| 5,627,918 A | 5/1997 | Carasso | |
| 7,359,576 B1* | 4/2008 | Worthington | G06T 5/20 382/205 |
| 7,561,186 B2* | 7/2009 | Poon | G06T 5/004 348/208.99 |
| 8,156,116 B2* | 4/2012 | Graham | G06F 17/30035 705/14.4 |
| 8,184,926 B2* | 5/2012 | Sun | G06T 5/50 345/629 |
| 8,203,615 B2* | 6/2012 | Wang | G06T 5/003 348/208.4 |
| 8,249,377 B1* | 8/2012 | Banner | G06T 5/003 382/255 |
| 8,330,827 B2 | 12/2012 | Wang | |
| 8,380,000 B2 | 2/2013 | Lee et al. | |
| 8,489,987 B2* | 7/2013 | Erol | G06F 17/30247 707/722 |
| 2005/0249429 A1* | 11/2005 | Kitamura | G03B 17/00 382/255 |
| 2008/0025627 A1* | 1/2008 | Freeman | H04N 5/23248 382/255 |
| 2008/0062287 A1* | 3/2008 | Agrawal | G03B 17/00 348/241 |
| 2008/0240607 A1* | 10/2008 | Sun | G06T 5/50 382/275 |
| 2009/0110303 A1* | 4/2009 | Nishiyama | G06K 9/00228 382/225 |
| 2009/0316995 A1 | 12/2009 | Szeliski et al. | |
| 2009/0324126 A1* | 12/2009 | Zitnick | G06T 5/003 382/275 |
| 2010/0034476 A1* | 2/2010 | Kido | 382/243 |
| 2010/0183241 A1* | 7/2010 | Lin | G06T 5/003 382/270 |
| 2010/0329582 A1* | 12/2010 | Albu | G06T 5/003 382/255 |
| 2011/0019909 A1* | 1/2011 | Farid | G06K 9/6234 382/160 |
| 2011/0090352 A1* | 4/2011 | Wang | G06T 5/003 348/208.6 |
| 2011/0102642 A1* | 5/2011 | Wang | H04N 5/23248 348/241 |
| 2011/0115934 A1* | 5/2011 | Wang | G06T 3/4076 348/222.1 |
| 2011/0188770 A1* | 8/2011 | Weinberger | G06K 9/40 382/255 |
| 2011/0267507 A1* | 11/2011 | Kane | G02B 27/0075 348/241 |
| 2011/0292216 A1* | 12/2011 | Fergus | G03B 15/03 348/164 |
| 2012/0307116 A1* | 12/2012 | Lansel | G06T 3/4053 348/273 |
| 2013/0121589 A1* | 5/2013 | Gokturk | G06F 17/30253 382/195 |
| 2013/0163859 A1 | 6/2013 | Nowozin et al. | |
| 2015/0030237 A1* | 1/2015 | Jancsary | G06K 9/6282 382/159 |

OTHER PUBLICATIONS

Wang, et al.,"Kernel Optimization for Blind Motion Deblurring with Image Edge Prior", In Proceedings of in Mathematical Problems in Engineering, vol. 2012, Article ID 639824, Feb. 20, 2012, pp. 6.

Li, et al.,"Exploring Aligned Complementary Image Pair for Blind Motion Deblurring", In Proceedings of in IEEE Conference on Computer Vision and Pattern Recognition, Jun. 20, 2011, pp. 8.

Breiman, Leo, "Bagging Predictors", In Machine Learning, vol. 24, Issue 2, Aug. 1996, 18 pages.

Domke, Justin, "Learning Graphical Model Parameters with Approximate Marginal Inference", To Appear in IEEE Transactions on Pattern Analysis and Machine Intelligence, Jan. 15, 2013, 22 pages.

Jancsary, et al., "Loss-Specific Training of Non-Parametric Image Restoration Models: A New State of the Art", In 12th European Conference on Computer Vision, Aug. 2, 2012, 14 pages.

Jancsary, et al., "Regression Tree Fields—An Efficient, Non-parametric Approach to Image Labeling Problems", In IEEE Computer Society Conference on Computer Vision and Pattern Recognition, Apr. 10, 2012, 8 pages.

Meer, Peter, "Robust Techniques for Computer Vision", In Book—Emerging Topics in Computer Vision, Jul. 31, 2004, 76 pages.

Schmidt, et al., "Discriminative Non-blind Deblurring", In Conference on Computer Vision and Pattern Recognition, Apr. 20, 2013, 8 pages.

Xu, et al., "Two-Phase Kernel Estimation for Robust Motion Deblurring", In Proceedings of the 11th European Conference on Computer Vision, Part I, Sep. 5, 2010, 14 pages.

Xu et al. "Unnatural L0 Sparse Representation for Natural Image Deblurring." In CVPR 2013.

F. Couzinié-Devy, J. Sun, K. Alahari, and J. Ponce. Learning to Estimate and Remove Non-uniform Image Blur. In IEEE Conference on Computer Vision and Pattern Recognition, Jan. 2013 Available at: http://www.di.ens.fr/willow/pdfscurrent/couzinie-devy13.pdf.

Tai, et al., "Nonlinear Camera Response Functions and Image Deblurring: Theoretical Analysis and Practice", IEEE Transactions on Pattern Analysis and Machine Intelligence (TPAMI), Feb. 14, 2013, Available at: http://yuwing.kaist.ac.kr/papers/pami_deblurCRF_final.pdf 14 pages.

Zhang, et al., "Sparse Representation Based Blind Image Deblurring", In IEEE International Conference on Image Processing, Jul. 11, 2011, 6 pages.

Meghrajani, et al., "An Interactive Deblurring Technique for Motion Blur", In International Journal of Computer Applications, vol. 60, Issue 3, Dec. 2012, 5 pages.

Zheng, Hongwei, "Bayesian Learning and Regularization for Unsupervised Image Restoration and Segmentation", In Proceedings of a PhD Dissertation, Jul. 20, 2007, 220 pages.

Boccuto, et al., "A GNC Algorithm for Deblurring Images with Interacting Discontinuities", In Proceedings of 6th Congress of the Italian Society for Applied and Industrial Mathematics, May 27, 2002, 15 pages.

Arbelaez, et al., "Contour Detection and Hierarchical Image Segmentation", In Proceedings of Transactions on Pattern Analysis and Machine Intelligence, vol. 33, Issue 5, May 2011, 19 pages.

Barbu, Adrian, "Learning Real-Time MRF Inference for Image Denoising", In IEEE Conference on Computer Vision and Pattern Recognition, Jun. 20, 2009, 8 pages.

Black, et al., "On the Unification of Line Processes, Outlier Rejection, and Robust Statistics with Applications in Early Vision", In Journal of International Journal of Computer Vision, vol. 19, Issue 1, Jul. 1996, 53 pages.

Burger, et al., "Image Denoising: Can Plain Neural Networks Compete with BM3D?", In IEEE Conference on Computer Vision and Pattern Recognition, Jun. 16, 2012, 8 pages.

Charbonnier, et al., "Two Deterministic Half-Quadratic Regularization Algorithms for Computed Imaging", In IEEE International Conference Image Processing, vol. 2, Nov. 13, 1994, 5 pages.

Cho, et al., "Fast Motion Deblurring", In Journal of ACM Transactions on Graphics, vol. 28, Issue 5, Dec. 2009, 8 pages.

Fergus, et al., "Removing Camera Shake from a Single Photograph", In Journal of ACM Transactions on Graphics, vol. 25, Issue 3, Jul. 2006, 8 pages.

Frohlich, et al., "As Time Goes By-Anytime Semantic Segmentation with Iterative Context Forests", In Proceedings of Pattern Recognition—Joint 34th DAGM and 36th OAGM Symposium, Aug. 28, 2012, 10 pages.

Gao, et al., "How Well do Filter-based MRFs Model Natural Images?", In Proceedings of Pattern Recognition—Joint 34th DAGM and 36th OAGM Symposium, Aug. 28, 2012, 10 pages.

Geman, et al., "Constrained Restoration and the Recovery of Discontinuities", In IEEE Transactions on Pattern Analysis and Machine Intelligence, vol. 14, Issue 3, Mar. 1992, 17 pages.

(56) References Cited

OTHER PUBLICATIONS

Geman, et al., "Nonlinear Image Recovery with Half-Quadratic Regularization", In IEEE Transactions on Image Processing, vol. 4, Issue 7, Jul. 1995, 15 pages.

Hinton, et al., "A Fast Learning Algorithm for Deep Belief Nets", In Journal of Neural Computation, vol. 18, Issue 7, Jul. 2006, 28 pages.

Jancsary, et al., "Loss-Specific Training of Non-Parametric Image Restoration Models: A New State of the Art", In Proceedings of the 12th European Conference on Computer Vision, Oct. 7, 2012, 14 pages.

Jancsary, et al., "Regression Tree Fields—An Efficient, Non-parametric Approach to Image Labeling Problems", In IEEE Conference on Computer Vision and Pattern Recognition, Apr. 10, 2012, 8 pages.

Kohler, et al., "Recording and Playback of Camera Shake: Benchmarking Blind Deconvolution with a Real-World Database", In Proceedings of 12th European Conference on Computer Vision, Oct. 7, 2012, 14 pages.

Krishnan, et al., "Fast image Deconvolution Using Hyper-Laplacian Priors", In Proceedings of 23rd Annual Conference on Neural Information Processing Systems, Dec. 7, 2009, 9 pages.

Levin, et al., "Image and Depth from a Conventional Camera with a Coded Aperture", In Journal of ACM Transactions on Graphics, vol. 26, Issue 3, Jul. 2007, 9 pages.

Levin, et al., "Efficient Marginal Likelihood Optimization in Blind Deconvolution", In IEEE Conference on Computer Vision and Pattern Recognition, Jun. 20, 2011, 8 pages.

Levin, et al., "Understanding and Evaluating Blind Deconvolution Algorithms", In IEEE Computer Society Conference on Computer Vision and Pattern Recognition, Jun. 20, 2009, 8 pages.

Lucy, L. B., "An Iterative Technique for the Rectification of Observed Distributions", In the Astronomical Journal, vol. 79, Jun. 1974, 10 pages.

Palmer, et al., "Variational EM Algorithms for Non-Gaussian Latent Variable Models", In Proceedings of Neural Information Processing Systems, Dec. 5, 2005, 8 pages.

Richardson, William Hadley, "Bayesian-Based Iterative Method of Image Restoration", In Journal of the Optical Society of America, vol. 62, Jan. 1972, 5 pages.

Roth, et al., "Fields of Experts", In International Journal of Computer Vision, Apr. 2009, 25 pages.

Schmidt, et al., "Bayesian Deblurring with Integrated Noise Estimation", In the 24th IEEE Conference on Computer Vision and Pattern Recognition, Jun. 20, 2011, 8 pages.

Tappen, et al., "Learning Gaussian Conditional Random Fields for Low-Level Vision", In IEEE Computer Society Conference on Computer Vision and Pattern Recognition, Jun. 18, 2007, 8 pages.

Tu, Zhuowen, "Auto-context and Its Application to High-level Vision Tasks", In IEEE Conference on Computer Vision and Pattern Recognition, Jun. 23, 2008, 8 pages.

Wainwright, et al., "Scale Mixtures of Gaussians and the Statistics of Natural Images", In Proceedings of Advances in Neural Information Processing Systems, Nov. 29, 1999, 7 pages.

Couzinie-Devy, et al., "Learning to Estimate and Remove Non-Uniform Image Blur", In 26th IEEE Conference on Computer Vision and Pattern Recognition, Apr. 19, 2013, 8 pages.

Colonnese, et al., "Blind Image Deblurring Driven by Nonlinear Processing in the Edge Domain", In EURASIP Journal on Applied Signal Processing, vol. 2004, Jan. 2004, 14 pages.

Ji, et al., "A Two-Stage Approach to Blind Spatially-Varying Motion Deblurring", In IEEE Conference on Computer Vision and Pattern Recognition, Jun. 16, 2012, 8 pages.

Sun, et al., "Edge-based Blur Kernel Estimation Using Patch Priors", In Proceedings of the IEEE International Conference on Computational Photography, Apr. 19, 2013, 8 pages.

S Cho, J Wang and S.Lee, "Handling Outliers in non-blind image deconvolution" ICCV 2011.

L Yuan, J Sun, L Quan and H-Y Shum. "Progressive inter-scale and intra-scale non-blind image deconvolution". ACM T. Graphics 27(3), 2008.

Schmidt, et al; "Discriminative Non-Blind Deblurring" IEEE conf an Computer Vision and Pattern Recognition, Portland OR, Jun. 2013.

Jancsary et al; U.S. Appl. No. 13/862,415, filed Apr. 14, 2013 entitled "Image Deblurring".

Jancsary et al; U.S. Appl. No. 13/949,940, filed Jul. 24, 2013 entitled "Image Restoration Cascade".

Krishnan et al., "Blind deconvolution using normalized sparsity measure", CVPR 2011.

* cited by examiner

BLIND IMAGE DEBLURRING WITH CASCADE ARCHITECTURE

BACKGROUND

Previous approaches to automatically deblurring digital photographs have involved so called "blind" and "non blind" image deblurring.

Non blind image deblurring reconstructs a sharp image from a blurred image, given an already available blur kernel estimate. In contrast, blind image deblurring attempts to simultaneously reconstruct both a blur kernel and a sharp image.

There is an ongoing desire to improve the accuracy of image deblurring systems. Previous approaches to automatically deblurring digital photographs often introduce artifacts. For example, ringing artifacts are introduced where intensity values are inappropriately altered so that ripple-like or ghost-like effects appear around objects depicted in the image. Another problem is that smooth areas are often reconstructed at the expense of fine detail.

Existing image deblurring systems are typically not operable on devices with limited memory and processing capacity such as smart phones and embedded devices. Also, existing image deblurring systems may be slow and/or difficult to use by end users who are not familiar with image deblurring processes.

The embodiments described below are not limited to implementations which solve any or all of the disadvantages of known image deblurring systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Blind image deblurring with a cascade architecture is described, for example, where photographs taken on a camera phone are deblurred in a process which revises blur estimates and estimates a blur function as a combined process. In various examples the estimates of the blur function are computed using first trained machine learning predictors arranged in a cascade architecture. In various examples a revised blur estimate is calculated at each level of the cascade using a latest deblurred version of a blurred image. In some examples the revised blur estimates are calculated using second trained machine learning predictors interleaved with the first trained machine learning predictors.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Common reference numerals are used to designate similar parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a camera phone, the system described is provided as an example and not a limitation. As those skilled in the art will appreciate, the present examples are suitable for application in a variety of different types of image processing systems. A non-exhaustive list of examples is: dedicated digital cameras, video cameras, medical imaging systems, traffic image systems, security imaging systems, satellite image systems and other imaging systems.

Figure 1:
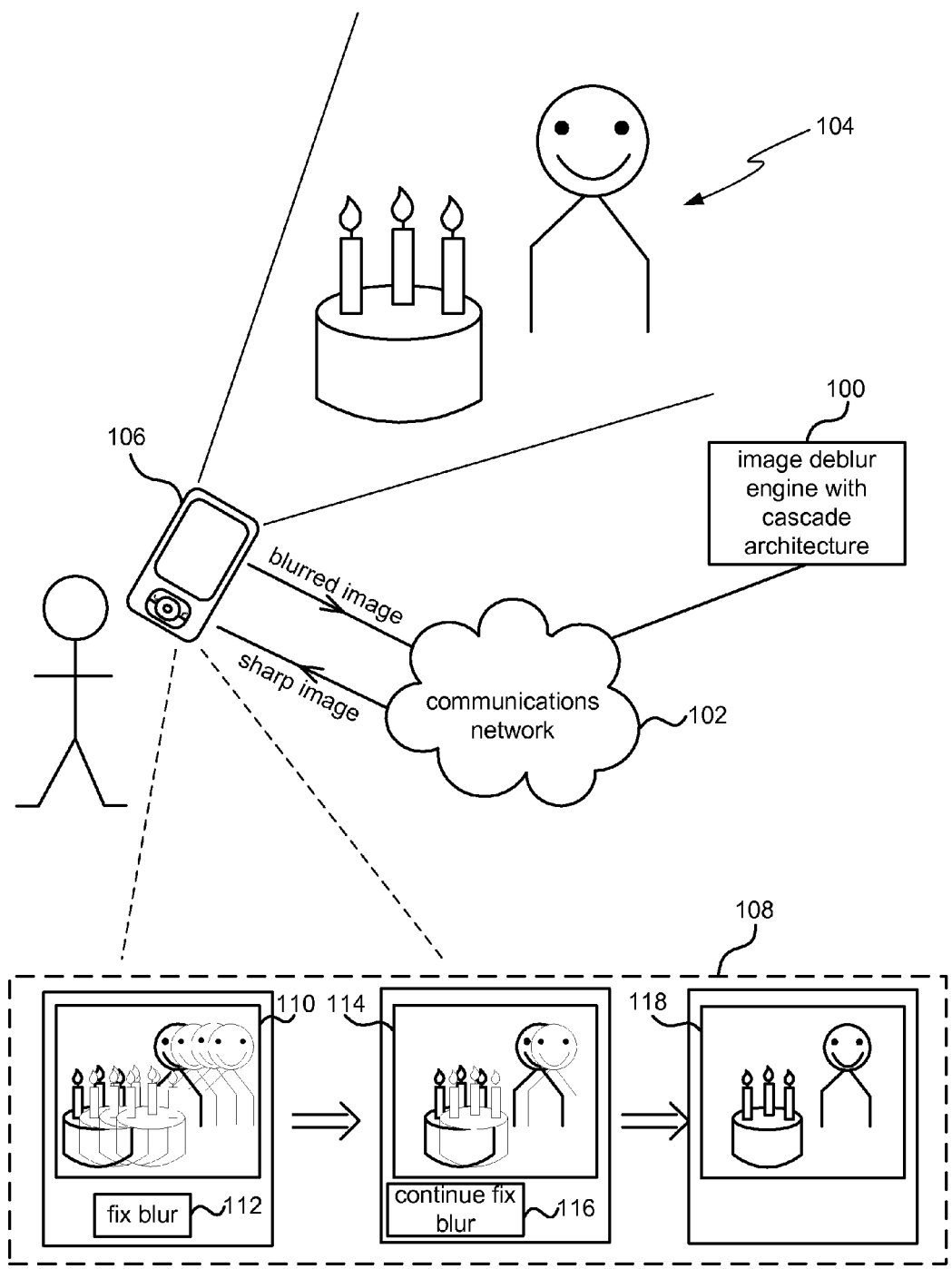
FIG. 1 is a schematic diagram of a camera phone used to capture an image of a scene and of a blind image deblur engine with a cascade architecture, used to deblur the captured image.

FIG. 1 is a schematic diagram of a camera phone 106 used to capture an image 110 of a scene 104 and of an image deblur engine 100 used to deblur the captured image. The image deblur engine 100 has a cascade architecture and is a trained machine learning system giving blind image deblurring. As mentioned above blind image deblurring attempts to reconstruct both a blur kernel and a sharp image as a combined process. In various examples the cascade architecture comprises a plurality of machine learning predictors which are trained to predict parameters of a blur function. The blur function is used to compute a sharp image from a blurred image. In examples, revised blur estimates are interleaved in the cascade architecture. The revised blur estimates may be calculated using latest recovered versions of the blurred image at each layer of the cascade. In this way high quality deblur results are obtained with little or no artifacts. In some examples quality is further improved by using second trained machine learning predictors to compute the revised blur estimates. By using a cascade architecture a robust system is achieved which enables an end user to simply control a trade off between deblur quality and processing time.

In the examples described herein blind image deblurring involves a blurred image y being modeled as a convolution of a blur kernel k with a hidden, sharp image x under additive noise n. This may be expressed as the following formula:

$$y = k \otimes x + n$$

Blur kernels and convolution are explained in more detail below.

In this example the image deblur engine 100 is located in the cloud and is accessible to the camera phone 106 via a communications network 102 such as the internet or any other suitable communications network. However, it is also possible for the image deblur engine 100, in whole or in part, to be integral with the camera phone 106.

The camera phone 106 is held by a person (indicated schematically) to take a photograph of an indoor scene comprising a birthday cake and a child. Because the scene is indoor the light levels may be relatively low so that the camera phone 106 automatically sets a longer exposure time. As the person takes the digital photograph (or video) he or she inadvertently shakes or moves the camera phone during the exposure time. This causes the captured image 110 to be blurred. A display 108 at the camera phone is indicated schematically in FIG. 1 and shows the blurred image 110 schematically. In practice the blur acts to smooth regions of the image so that fine detail is lost (or, depending on the extent of the blur, the image content can no longer be perceived/parsed, i.e. to a human it is no longer clear what the image actually contains. A graphical user interface at the camera phone may display an option "fix blur" 112 or similar which may be selected by the user to generate a first new version 114 of the blurred image in which the blur is at least partly removed. The new version 114 may be displayed at the camera phone.

A "continue fix blur" button 116 may be available at a graphical user interface of the camera phone. If user input is received indicating the "continue fix blur" option is selected then a second new version 118 of the blurred image in which the blur is further removed may be computed. The second new version 118 may be displayed at the camera phone. Additional new versions may be computed and displayed in a similar manner although only two are shown in FIG. 1 for clarity.

In this example the camera phone sends the blurred image 110 to an image deblur engine 100 which is in communication with the camera phone over a communications network 102. The image deblur engine 100 calculates at least one sharp image from the blurred image and returns the sharp image(s) to the camera phone 106. The images may be compressed prior to sending in order to reduce the amount of communications bandwidth; and decompressed when received.

In this example the image blur is due to camera shake. However, other forms of image blur may also be addressed with the image deblur engine. For example, blur arising from parts of the image that are not in focus, referred to as out-of-focus blur. Another example is blur arising due to motion of objects in the scene during exposure time. For example, blur arising due to motion of objects in the scene may be handled by dividing the image, for example, along a regular grid, into subimages. Each subimage may be processed individually and the results merged. Because each subimage has its own blur kernel estimate, these blur kernel estimates may differ and take into account different moving objects and types of blur.

The image deblur engine 100 is computer implemented using software and/or hardware. It may comprise one or more graphics processing units or other parallel processing units arranged to perform parallel processing of image elements.

For example, the functionality of the image deblur engine described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 2:
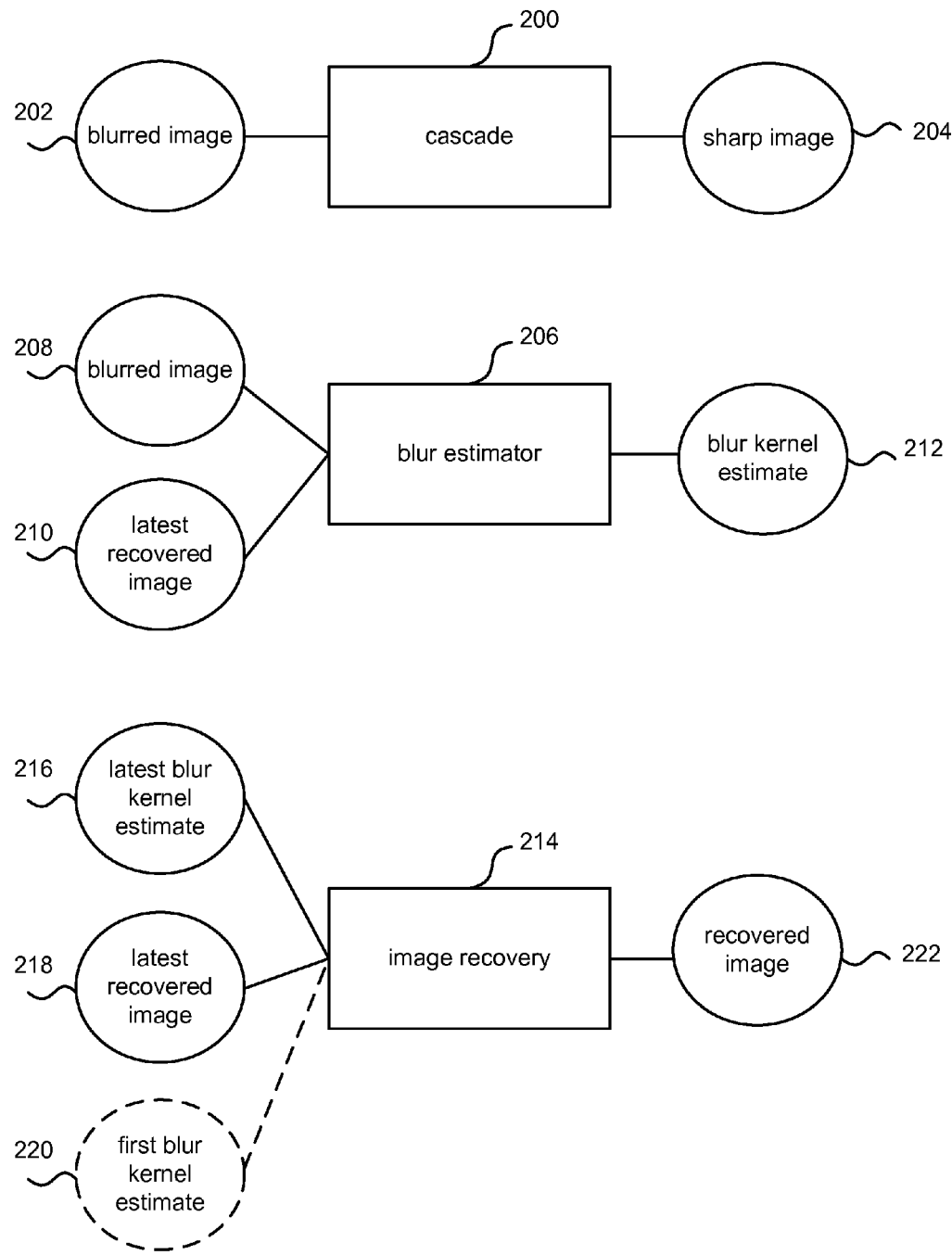
FIG. 2 is a schematic diagram of the image deblur engine of FIG. 1 in more detail and also showing a blur estimator and an image recovery component.

More detail about the image deblur engine 100 is now given with respect to FIG. 2. The image deblur engine 100 has an input to receive a blurred image 202 in compressed or uncompressed form. If received in compressed form, the deblur engine 100 decompresses the image. The deblur engine comprises two types of component arranged in series in a cascade architecture. At least one of each type of component is used. In various embodiments two or more of each type of component are used. The components are computer-implemented using software and/or hardware.

A first one of the two types of component may be a blur kernel estimator 206 as illustrated schematically in FIG. 2. The blur kernel estimator 206 is a type of blur estimator which estimates blur present in a blurred image. In some examples the blur estimator comprises a trained machine learning predictor but this is not essential.

A blur kernel may be a 2D array of numerical values which may be convolved with an image in order to create blur in that image. A blur kernel may be stored in other formats such as a list or other structure; that is a blur kernel does not have to be stored as an array. Convolution is a process whereby each image element is updated so that it is the result of a weighted summation of neighboring image elements. The set of neighboring image elements and the weight of each image element are specified in a kernel. As mentioned above, the kernel may be stored as a 2D array or in other formats. The center of the kernel is aligned with each image element so that the aligned weights stored in the kernel can be multiplied with the image elements. Given a blurred image 208 and a recovered version of the blurred image 210, a blur kernel predictor 206 is able to compute an estimate of a blur kernel 212 which describes at least part of the blur present in the blurred image 208. Optionally the blur kernel predictor 206 computes certainty information about the predicted blur kernel. For example, this may include blur due to camera shake and/or out-of-focus blur. Other parts of the blur due to noise or other factors may not be described by the blur kernel.

A second one of the two types of component is an image recovery component 214 which comprises a trained machine learning predictor. This component produces as output a recovered image 222. Optionally the image recovery component computes certainty information about the recovered image. It takes as input a blur kernel estimate 216 and a blurred image 218 such as a latest recovered image 218. In some examples the image recovery component 214 also takes a first blur kernel estimate 220 as input.

The trained machine learning predictors may be any combination of one or more of: a neural network, a linear regression model, a regression tree, a regression tree field (RTF). The machine learning predictor (in any one of more of the examples herein) may be non-parametric which means that the predictor is not limited to a specific form so that as more training images are used the predictor becomes more expressive. This gives benefits because the properties of natural images (photographs) are complex and difficult to model accurately.

A regression tree field is a plurality of regression trees used to represent a conditional random field. A conditional random field (CRF) is a statistical model for predicting a label of an image element by taking into account other image elements in the image. A Gaussian conditional random field comprises unary potentials and pair-wise potentials. In an RTF one or more regression trees may be associated with unary potentials of a conditional random field and one or more regression trees may be associated with pairwise potentials of a conditional random field. Unary potentials are related to individual image elements. Pair-wise potentials are related to pairs of image elements. Each leaf of the regression tree may store an individual linear regressor that determines a local potential.

A regression tree comprises a root node connected to a plurality of leaf nodes via one or more layers of split nodes. Image elements of an image may be pushed through a regression tree from the root to a leaf node in a process whereby a decision is made at each split node. The decision is made according to characteristics of the image element and characteristics of test image elements displaced therefrom by spatial offsets specified by the parameters at the split node. At a split node the image element proceeds to the next level of the tree down a branch chosen according to the results of the decision. During training, image statistics (also referred to as features) are chosen for use at the split nodes and parameters are stored at the leaf nodes. These parameters are then chosen so as to optimize the quality of the predictions (as measured by a loss function) on the training set. After training, image elements and/or features of an input poor quality image are pushed through the regression trees to find values of the parameters.

Regression tree fields are described in U.S. patent application Ser. No. 13/337,324 "Regression Tree Fields" filed on 27 Dec. 2011. Regression tree fields are also described in Jancsary et al. "Regression tree fields—an efficient, non-parametric approach to image labeling problems" CVPR 2012, and in Jancsary et al. "Loss-specific Training of Non-Parametric Image Restoration Models: A New State of the Art", ECCV 2012.

Figure 3:
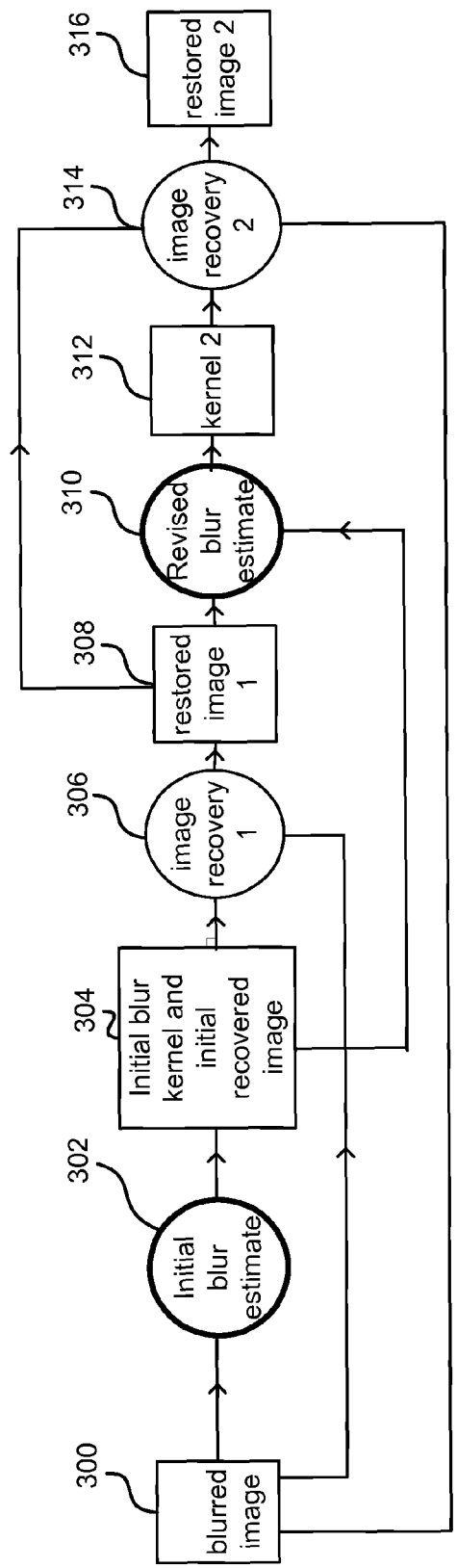
FIG. 3 is a schematic diagram of a cascade arranged for blind image deblurring.

FIG. 3 is a schematic diagram of a cascade of trained machine learning predictors 306, 314. In this example each layer of the cascade comprises one predictor named in FIG. 3 as an image recovery component. Two cascade layers are shown in this example but the number of cascade layers may be increased.

Interleaved with the trained machine learning predictors 306, 314 are blur kernel estimates. These may be calculated by one or more blur estimators which are not trained machine learning components. The blur kernel estimates are revised at each level of the cascade using the latest recovered image available at the respective stages. In this way each machine learning predictor 306, 314 is equipped with a refined blur estimate.

An initial blur kernel estimator 302 takes a blurred image 300 that it is required to deblur. The initial blur kernel estimator 302 computes an initial estimate of the blur kernel and an initial recovered image 304. For example, the initial blur kernel estimator 302 uses a two-phase estimation algorithm which first calculates an approximate estimate of the blur kernel and then refines this at a second phase using a more difficult to optimize sparsity constraint on the blur kernel. An example of a two-phase estimation algorithm which may be used is given in Xu and Jia "Two-phase kernel estimation for robust motion deblurring." In ECCV 2010. Once the blur kernel estimate is computed this may be used to compute an initial recovered image from the blurred image 300. Note that it is not essential to use the two-phase algorithm of Xu and Jia mentioned above. Other methods may be used such as Xu et al. "Unnatural L0 Sparse Representation for Natural Image Deblurring." In CVPR 2013. Another such method is: Cho and Lee. "Fast Motion Deblurring." ACM Transactions on Graphics, 28, 2009. More examples include: Levin et al., "Efficient marginal likelihood optimization in blind deconvolution", CVPR 2011; Krishnan et al., "Blind deconvolution using normalized sparsity measure", CVPR 2011.

A first image recovery component 306 takes as input the initial blur kernel and initial recovered image 304. It also takes as input the blurred image 300. The first image recovery component comprises a trained machine learning system as mentioned above which predicts parameters of a blur function optionally with certainty information about the predicted values. A blur function is an expression which may be used to calculate the probability of a sharp image given a corresponding blurred input image and a fixed blur matrix K (which is derived from the blur kernel).

The blur function may be the result of using point estimation with a probability distribution expressing the probability of a sharp image given a blurred form of the sharp image and a fixed blur kernel estimate. The fixed blur kernel estimate expresses or describes an estimate of the blur applied to the sharp image to obtain the blurred image. In various examples the blur function is expressed as a Gaussian conditional random field (CRF) as follows:

$$p(x|y,K)$$

Which may be expressed in words as: the probability of sharp image x given blurred input image y and a fixed blur matrix K (expressing the blur kernel). The blur matrix K (which is different from the blur kernel) is a matrix of size N by N where N is the number of image elements. It may be formed from the blur kernel by placing the blur kernel around each image element and expressing the weighted summation as a matrix-vector multiplication (each row of the blur matrix corresponds to one application of the blur kernel). By multiplying the image x with the blur matrix K the image is convolved with the blur kernel; that is the convolution is expressed as matrix-vector multiplication. A conditional random field (CRF) is a statistical model for predicting a label of an image element by taking into account other image elements in the image. A Gaussian conditional random field comprises unary potentials and pair-wise potentials.

An optimizer of the blur function may be expressed as being related to the fixed blur matrix K and to parameters (matrices $\Theta$ and $\theta$ in the example below) which are functions of the input image y. For example, $$\arg\max_x p(x|y,K) = (\Theta(y) + \alpha K^T K)^{-1}(\theta(y) + \alpha K^T y)$$

Which may be expressed in words as, the sharp image x which gives the optimal probability under the model given input blurry image y and input blur matrix K is equal to the product of: the inverse of, parameter values $\Theta$ regressed from the input blurry image y plus a scalar based on the noise level of the input blurry image times a transpose of the blur matrix K times itself; and parameter values $\theta$ regressed from the blurry input image y plus a scalar based on the noise level of the input blurry image times a transpose of the blur matrix K applied to the input blurry image.

Once the values of the parameters Θ and θ are available from the trained machine learning system within image recovery component 306 they may be input to an image deblur process. This process is computer implemented and it inputs the values of the parameters Θ and θ to the above expression of the blur function. It computes a sharp image (see restored image 308 of FIG. 3) by solving the expression as a sparse linear system. The sharp image 308 may be displayed, stored or sent to another entity.

The machine learning system of any of the image recovery components may comprise a trained regression tree field (RTF), a plurality of trained regression tree fields, or any other suitable trained regressor(s).

A second blur kernel predictor 310 takes as input at least the latest restored image 308. In some examples the blur kernel predictor 310 takes the first restored image 308 and the original, blurred image 300 as input. The second (and subsequent) blur kernel predictors may compute a refined blur kernel estimate 312 by minimizing the following objective:

$$\|y-k_i \otimes x_i\|^2 + \gamma \|k_i\|_1$$

Where $\|\cdot\|$ denotes the Euclidean norm and $\gamma$ is a weight to control the strength of an $L^1$-norm sparsity constraint for the blur kernel. The blur kernel predictor may be arranged to calculate the minimization of the above objective using iteratively reweighted least squares or any other suitable method. The above objective may be expressed in words as trying to reduce an amount which is the sum of: the squares of the absolute difference between the blurred input image and the convolution of the blur kernel and the latest recovered image, and the absolute values in the blur kernel matrix. For example, the above formula may be used in the gradient domain, by using the image gradients of y and xi rather than the images themselves in the above formula.

The second (and subsequent) blur kernel predictors may also take as input the first blur kernel 304. In this situation the blur kernel predictor is able to compare the first blur kernel 304 with its latest blur kernel and select which to use. For example, this selection may be made by comparing the agreement when each blur kernel is used to reconstruct the observed blurred image given the current sharp estimate. The blur kernel predictor has the ability to choose to use the first blur kernel 304 rather than compute a revised blur kernel in some examples.

A second image recovery component 314 receives the second blur kernel 312 and at least one of the latest restored image 308 and the blurred image 300. The second image recovery component comprises a trained machine learning predictor as described above for the first image recovery component 306. The second image recovery component calculates restored image 316.

Image recovery component 306 and image recovery component 3 310 may be referred to as internal layers of a cascade architecture. A predictor in an internal layer receives input which is the output of the previous layer. For example, image recovery component 2 314 receives input which is restored image 1 308 output by image recovery component 1 306. Each layer receives the poor quality image 300 as input.

In some examples a predictor in an internal layer may also receive input from earlier layers, which are not the immediately previous layer. This is illustrated in FIG. 3 which shows restored image 1 308 being used as input to image recovery component 314.

Figure 4:
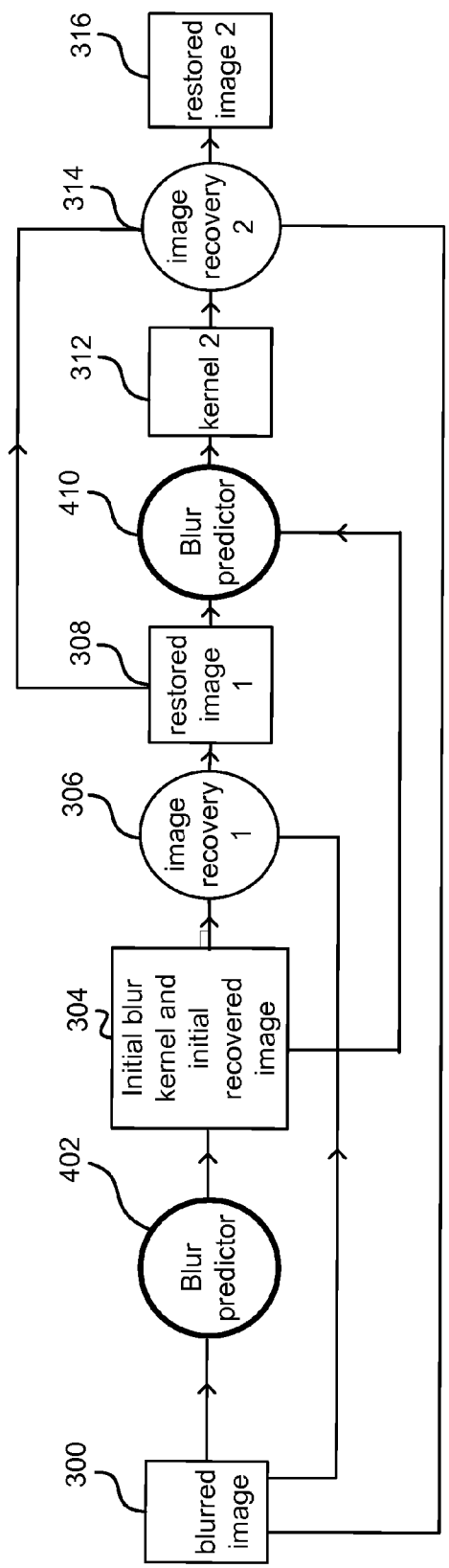
FIG. 4 is a schematic diagram of a cascade of two types of trained machine learning predictors arranged for blind image deblurring

FIG. 4 is a schematic diagram of a cascade of predictors. In this example each layer of the cascade comprises two trained machine learning predictors: a blur kernel predictor and an image recovery component. The predictors 402, 306, 410, 314 are connected in series. Two cascade layers are shown in this example. However the number of cascade layers may be increased. There can be two or more cascade layers depending on the particular task involved and the computational resources available.

The components and operation of the arrangement of FIG. 4 is similar to that of FIG. 3 except that blur kernel predictors 402, 410 are now used which comprise trained machine learning predictors. These are trained to predict parameters of one or more filters which are used to estimate the blur kernel. For example, the above objective for finding the blur kernel update is changed by replacing $x_i$ with a term comprising a plurality of parameterized filters applied to the latest recovered image. The blur kernel estimation is then learned to take as inputs the filter responses in addition to the latest recovered image. For example, filters that are sensitive to edges of varying orientation can be used so that the estimated blur kernel accurately reconstructs edges.

Figure 5:
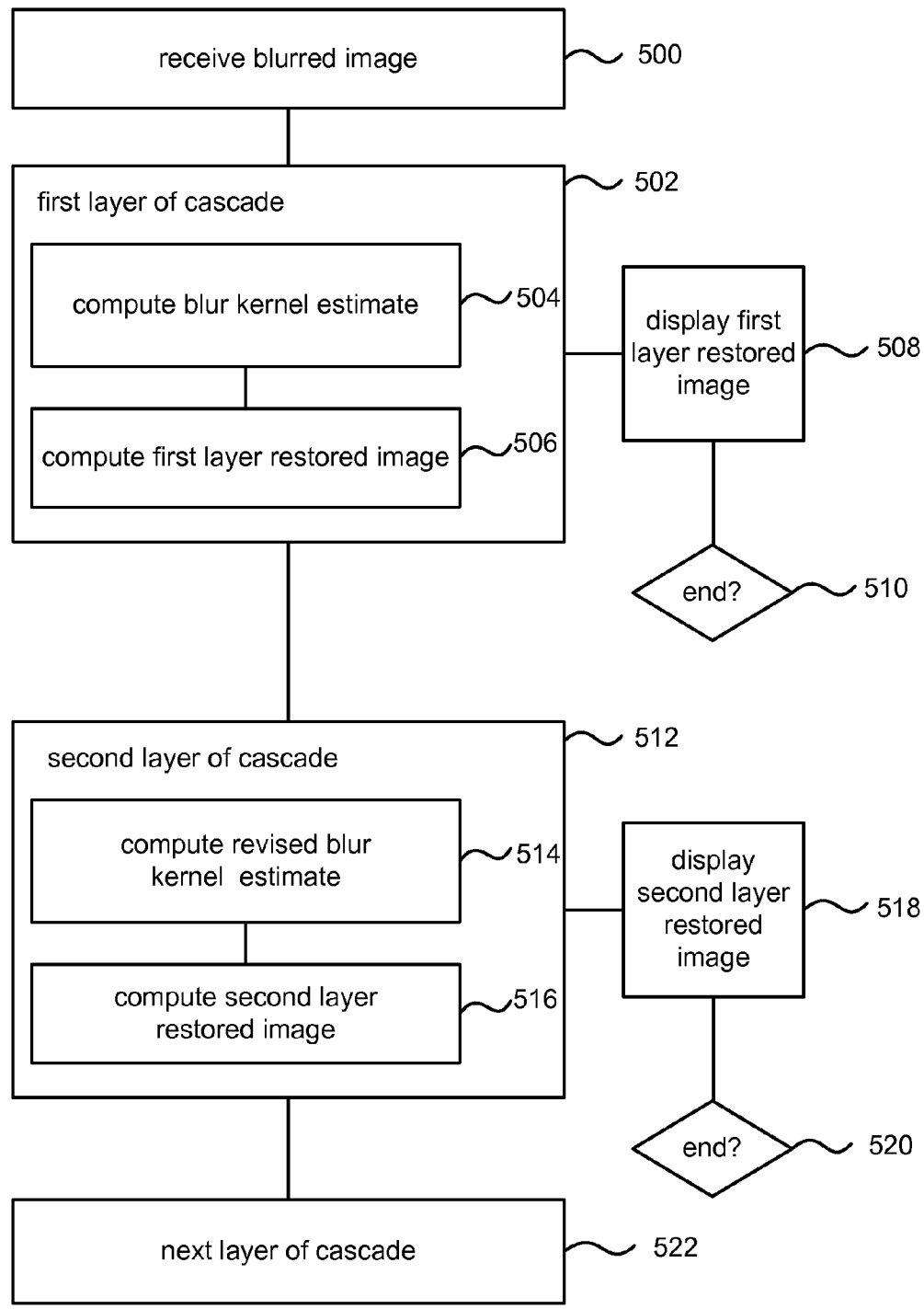
FIG. 5 is a flow diagram of a method of blind image deblurring.

FIG. 5 is a flow diagram of a method of operation at an image deblur system such as that of FIG. 3 or FIG. 4. A blurred image is received 500 at a processor and at a first layer of a cascade architecture 502 a blur kernel estimate is calculated 504 as described above. The blur kernel estimate is used to compute a first layer restored image 506 from the blurred image. The first layer restored image may be displayed 508 at a graphical user interface or other display and a decision 510 made whether to end the process. For example, user input may be received indicating to continue the process. If the process continues, a second layer of the cascade 512 computes a revised blue kernel estimate 514 as described above. The second layer also computed 516 a second layer restored image. The second layer restored image is optionally displayed 518 and a decision 520 made whether to end the process 520. For example, user input may be received indicating to continue the process. If the process continues, a next layer of the cascade 522 carries on the computation in a similar manner as for the previous layers. The process continues until there are no further layers of the cascade or until user input indicates the process is to end.

Figure 6:
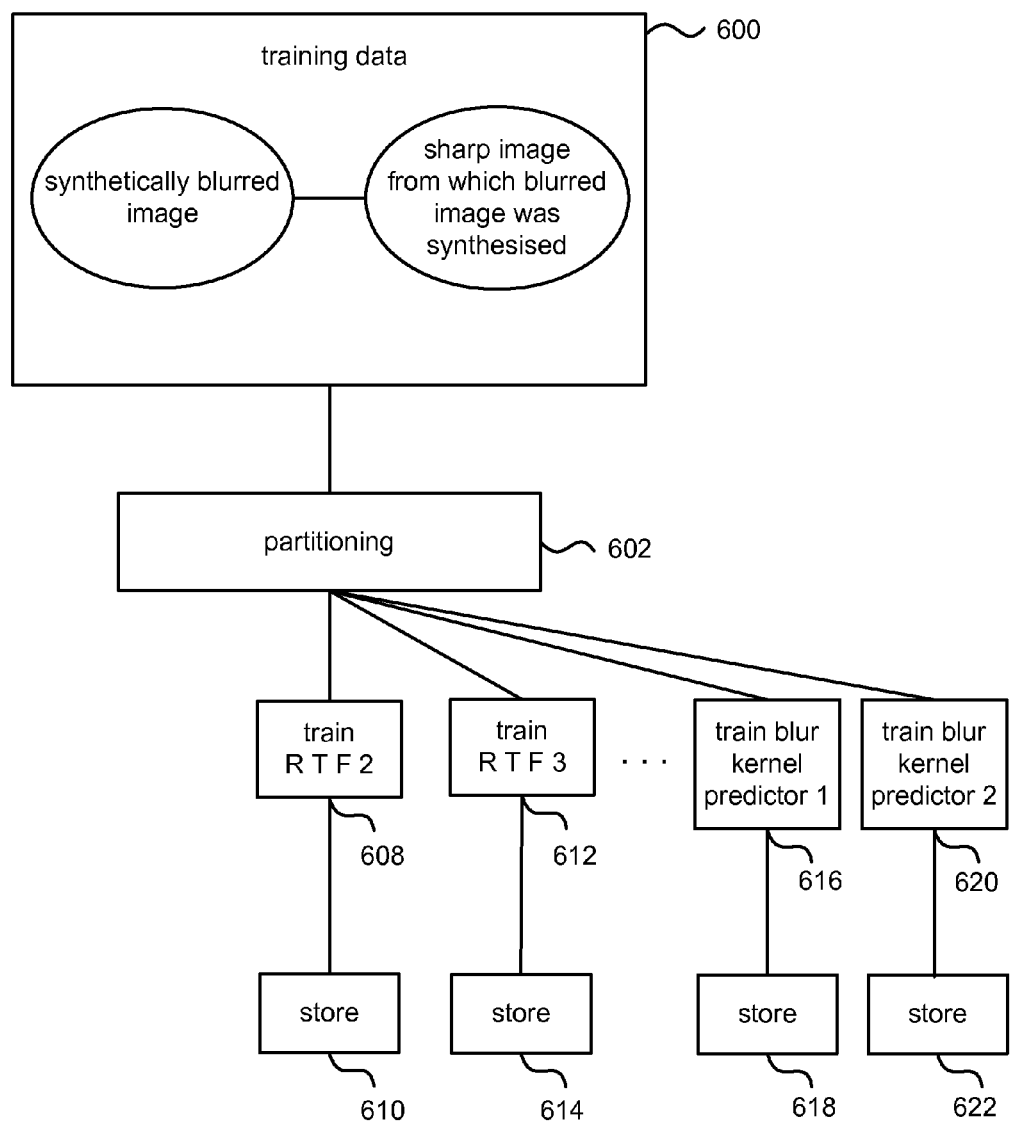
FIG. 6 is a schematic diagram of equipment and process for training a cascade architecture for blind image deblurring.

In order to train the machine learning predictors of the image recovery components, and optionally also of the blur kernel predictors, training data 600 is used. With reference to FIG. 6 the training data may comprise pairs of corresponding sharp and blurred images. Large amounts of training data are needed to achieve good quality functionality. However, this type of training data is difficult to obtain for natural, empirical images rather than for synthetically generated images. For example, one option is to use laboratory multi-camera arrangements to record real camera motions and the resulting blurred images. However, this is time consuming, expensive and does not result in natural digital photographs typically taken by end users. In the example of FIG. 6 the training data 600 comprises pairs of synthetically blurred natural images and sharp images from which the blurred images were synthesized.

The training data may be partitioned by a partitioning system 602 into training data sets so that each machine learning predictor in a given cascade may be trained on a different training data set. In this way the ability of the cascade system to generalize is enhanced.

The partitioning system may create the partitioned training data sets by simply dividing the training data or by using resampling, such as bootstrap resampling or any other resampling method. Bootstrap resampling is a process whereby random samples are taken (with replacement) from the original training data 600 and used to form a training data set. Because the samples are taken with replacement it is possible for a value to occur more than once in the sample.

In the example illustrated in FIG. 6 a cascade architecture with two layers is trained. Each layer comprises two types of predictor in this example: a regression tree field 608, 612 for predicting parameters of a blur function, and a regression tree field 616, 620 for predicting parameters of filters for computing a blur kernel.

During training a loss function is used to enable updates to be made to the predictors in the light of the training data examples. The loss function expresses a quality of restoration between input and output images of a trained machine learning predictor and is directly optimized during training. For example the loss function may comprise peak signal to noise ratio (PSNR), mean squared error (MSE), mean absolute deviation (MAD), or structural image similarity (SSIM). These are examples; other types of loss function may be used which express a quality of restoration between input and output images of a predictor. The loss function may be specified by a user, or may be preconfigured. In some examples, the loss function is selected automatically from possible loss functions according to the particular image deblur task. Once training is complete the trained machine learning predictors are stored 610, 614, 618, 622 by storing the learnt parameter values.

Figure 7:
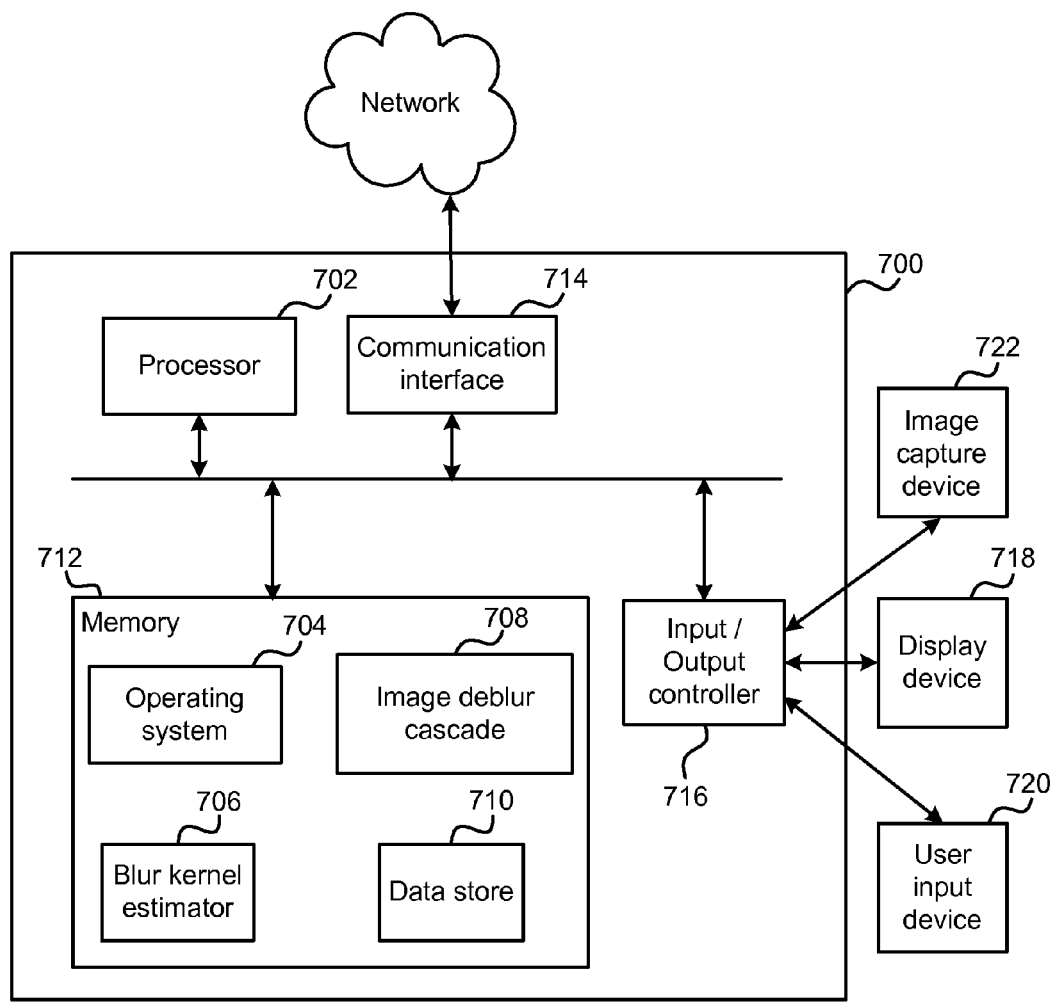
FIG. 7 illustrates an exemplary computing-based device in which embodiments of a blind image deblurring system may be implemented.

FIG. 7 illustrates various components of an exemplary computing-based device 700 which may be implemented as any form of a computing and/or electronic device, and in which embodiments of an image deblur engine or an image capture device incorporating an image deblur engine may be implemented.

Computing-based device 700 comprises one or more processors 702 which may be microprocessors, controllers or any other suitable type of processors for processing computer executable instructions to control the operation of the device in order to calculate a sharp image from a blurred image using blind deblurring. One or more of the processors may comprise a graphics processing unit or other parallel computing unit arranged to perform operations on image elements in parallel. In some examples, for example where a system on a chip architecture is used, the processors 702 may include one or more fixed function blocks (also referred to as accelerators) which implement a part of the method of image deblurring in hardware (rather than software or firmware).

Platform software comprising an operating system 704 or any other suitable platform software may be provided at the computing-based device to enable software implementing an image deblur cascade 705 or at least part of the image deblur cascade described herein to be executed on the device. Software implementing a blur kernel estimator 706 is present in some embodiments. It is also possible for the device to access a blur kernel estimator from another entity such as by using communication interface 714. A data store 710 at memory 712 may store training data, images, parameter values, blur kernels, or other data.

The computer executable instructions may be provided using any computer-readable media that is accessible by computing based device 700. Computer-readable media may include, for example, computer storage media such as memory 712 and communications media. Computer storage media, such as memory 712, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 712) is shown within the computing-based device 700 it will be appreciated that the storage may be distributed or located remotely and accessed via a network or other communication link (e.g. using communication interface 714).

The computing-based device 700 also comprises an input/output controller 716 arranged to output display information to a display device 718 which may be separate from or integral to the computing-based device 700. The display information may provide a graphical user interface which may display blurred images and deblurred images and icons such as the "fix blur" icon of FIG. 1. The input/output controller 716 is also arranged to receive and process input from one or more devices, such as a user input device 720 (e.g. a mouse, keyboard, camera, microphone or other sensor). In some examples the user input device 720 may detect voice input, user gestures or other user actions and may provide a natural user interface (NUI). This user input may be used to indicate when deblurring is to be applied to an image, to select deblurred images to be stored, to view images and for other purposes. In an embodiment the display device 718 may also act as the user input device 720 if it is a touch sensitive display device. The input/output controller 716 may also output data to devices other than the display device, e.g. a locally connected printing device.

Any of the input/output controller 716, display device 718 and the user input device 720 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of deblurring an image comprising:
   receiving, at one or more processors, a blurred image obtained by an image capture device;
   applying, at the one or more processors, the blurred image to a first blur predictor or estimator of a plurality of blur predictors or estimators to generate a first blur kernel or recovered image;
   applying, at the one or more processors, the first blur kernel or recovered image to a first trained machine learning predictor of a plurality of trained machine learning predictors to obtain a first restored version of the blurred image;
   applying, at the one or more processors, the first restored version of the blurred image to a subsequent blur predictor or estimator of the plurality of blur predictors or estimators to generate a subsequent blur kernel or recovered image, the plurality of blur predictors or estimators and the plurality of trained machine learning predictors being arranged in a cascade architecture comprising a plurality of layers connected in series, individual layers of the plurality of layers comprising at least one of the trained machine learning predictors and at least one of the plurality of blur predictors or estimators, and
   using, at the one or more processors, the cascade architecture to interleave steps of calculating revised estimates from the restored versions with trained machine learning prediction steps.

2. A method as claimed in claim 1 which is a method of blind image deblurring.

3. A method as claimed in claim 1 comprising applying the blurred image to the trained machine learning predictors arranged in the cascade architecture.

4. A method as claimed in claim 3 wherein using the cascade architecture to interleave steps of calculating the revised estimates from the restored versions with trained machine learning prediction steps includes at least one of the revised estimates being calculated based at least in part on a previous estimate, the previous estimate being not immediately prior to the revised estimate being calculated.

5. A method as claimed in claim 1 wherein the plurality of blur predictors or estimators are a plurality of second trained machine learning predictors.

6. A method as claimed in claim 5 comprising using the second trained machine learning predictors to calculate parameters of filters used to calculate an estimate of blur present in the blurred image.

7. A method as claimed in claim 5 comprising applying the blurred image to the first and second trained machine learning predictors arranged in a cascade architecture comprising a plurality of layers connected in series, each layer comprising at least one of each of the first and second trained machine learning predictors.

8. One or more computer storage media with device-executable instructions comprising:
   device-executable instructions to receive, at a processor, a blurred image obtained by an image capture device;
   device-executable instructions to apply the blurred image to a first blur predictor or estimator of a plurality of blur predictors or estimators to generate a first blur kernel or recovered image;
   device-executable instructions to apply the first blur kernel or recovered image to a first trained machine learning predictor of a plurality of trained machine learning predictors to obtain a first restored version of the blurred image;
   device-executable instructions to apply the first restored version of the blurred image to a subsequent blur predictor or estimator of the plurality of blur predictors or estimators to generate a subsequent blur kernel or recovered image, the plurality of blur predictors or estimators and the plurality of trained machine learning predictors being arranged in a cascade architecture comprising a plurality of layers connected in series, individual layers of the plurality of layers comprising at least one of the trained machine learning predictors and at least one of the plurality of blur predictors or estimators, and
   device-executable instructions to use the cascade architecture to interleave steps of calculating revised estimates from the restored versions with trained machine learning prediction steps.

9. An image deblur engine comprising:
   a processor arranged to receive a blurred image obtained by an image capture device;
   the processor further arranged to apply the blurred image to a first blur predictor or estimator of a plurality of blur predictors or estimators to generate a first blur kernel or recovered image;
   the processor further arranged to apply the first blur kernel or recovered image to a first trained machine learning predictor of a plurality of trained machine learning predictors to calculate a first restored version of the blurred image;
   the processor further arranged to apply the first restored version of the blurred image to a subsequent blur predictor or estimator of the plurality of blur predictors or estimators to generate a subsequent blur kernel or recovered image, the plurality of blur predictors or estimators and the plurality of trained machine learning predictors being arranged in a cascade architecture comprising a plurality of layers connected in series, individual layers of the plurality of layers comprising at least one of the trained machine learning predictors and at least one of the plurality of blur predictors or estimators, and to use the cascade architecture to interleave steps of calculating revised estimates from the restored versions with trained machine learning prediction steps.

10. An image deblur engine as claimed in claim 9 the trained machine learning predictors arranged in a cascade architecture comprising a plurality of layers connected in series, each layer comprising at least one of the trained machine learning predictors.

11. An image deblur engine as claimed in claim 10 wherein interleaving steps of calculating revised estimates from the restored versions with trained machine learning prediction steps includes at least one of the revised estimates being calculated based at least in part on a previous estimate, the previous estimate being not immediately prior to the revised estimate being calculated.

12. An image deblur engine as claimed in claim 10 wherein the blur estimators are second trained machine learning predictors.

13. An image deblur engine as claimed in claim 12 the second trained machine learning predictors arranged to calculate parameters of filters used to calculate an estimate of blur present in the blurred image.

14. An image deblur engine as claimed in claim 9 wherein the trained machine learning predictors comprise regression tree fields.

15. An image deblur engine as claimed in claim 12 wherein the blur estimators comprise regression tree fields.

16. An image deblur engine as claimed in claim 9 wherein the blur estimators are arranged to reduce an amount which is the sum of: squares of an absolute difference between the blurred input image and a convolution of a blur estimate and the latest recovered image, and the absolute values in the blur estimate.

17. An image deblur engine as claimed in claim 9 the trained machine learning predictors having been trained using pairs of empirical sharp images and blurred images calculated from the empirical sharp images.

18. An image deblur engine as claimed in claim 9 the trained machine learning predictors having been trained using a loss function which expresses deblur quality between a blurred image and a restored version of the blurred image.

19. An image deblur engine as claimed in claim 9 which is a blind image deblur engine.

20. An image deblur engine claimed in claim 9 the trained machine learning predictors being at least partially implemented using hardware logic selected from any one or more of: a field-programmable gate array, a program-specific integrated circuit, a program-specific standard product, a system-on-a-chip, a complex programmable logic device, a graphics processing unit.

* * * * *